3,347,823
TRANSPARENT COMPOSITIONS COMPRISING VINYL CHLORIDE POLYMER AND UNSATURATED DICARBOXYLIC ACID
Robert A. Buckley, Solon, Ohio, and Frank C. Russo, deceased, late of Parma, Ohio, by Nadine Russo, representative, Parma, Ohio, assignors to Ferro Corporation, Cleveland, Ohio, a corporation of Ohio
No Drawing. Filed Oct. 4, 1966, Ser. No. 584,274
8 Claims. (Cl. 260—45.85)

This invention relates generally to a halogen containing vinyl resin composition which has been compounded so as to promote maximum transparency through the utilization in said admixture of alpha-alkylidene or alpha cycloalkylidene succinic acids. This application is a continuation-in-part of our co-pending United States application Ser. No. 294,725 filed July 12, 1963 now abandoned.

Polymers and copolymers of halogen containing vinyl resins find wide application in various commercial devices and appliances wherein a high degree of transparency is a prime requisite. One example of such application is the rear window in the top of a convertible automobile.

Fused and pressed vinyl sheets vary in transparency. They are sometimes hazy when viewed by transmitted light because of inclusion of minute opaque particles of uncertain composition, or because of difference in refractive index of different chemical constituents present in heterogeneous dispersion. We have found that the incorporation of a class of organic acids, typified by itaconic acid, in certain ranges, to the pre-fusion mix of halogen containing homopolymers and copolymers, drastically reduces haze and greatly improves transparency, over a standard composition lacking the itaconic acid.

It is therefore an object of this invention to provide a system for minimizing haze and increasing transparency of halogen containing vinyl resins.

Another object of this invention resides in our unique composition comprising halogen containing vinyl resins in combination with itaconic and related acids in certain quantities as hereinafter described.

It is a further object of this invention to provide halogen containing vinyl resin compounds, which compounds display a higher degree of transparency than heretofore possible.

It is also an object of this invention to provide a method for achieving a fused halogen containing vinyl resin composition having improved transparency and freedom from haze.

It is a further object of this invention to provide a method for compounding a stabilizer for halogen containing vinyl resins by admixing with said stabilizer, prior to incorporation into said halogen containing vinyl resin, a succinic acid derivative comprising itaconic acid and its homologues.

It is also an object of this invention to provide as a composition a stabilizer for halogen containing vinyl resins which has incorporated therein a succinic acid derivative characterized by itaconic acid and its homologues as hereinafter described.

Broadly stated, this invention lies in the addition of from about 0.005 to about 0.5 part of acid per 100 parts by weight of resin to a halogen containing vinyl resin pre-fusion mix of one or more halogen containing vinyl polymers, then fusing said admixture to a highly transparent sheet.

As used herein vinyl resin polymers and polymers whose monomeric units are predominantly vinyl chloride shall be understood to mean vinyl chloride homopolymers and copolymers of vinyl chloride with vinyl acetate or vinylidene chloride wherein at least 75% of the monomeric units are monomeric units of vinyl chloride.

We consider the use of the itaconic class of acids in this respect to be unique, and the results derived therefrom highly unexpected because the acids of this invention, which for convenience we prefer to add to our pre-fusion mix in powdered form, are normally highly insoluble in organic solvents and would therefore be expected to be present in a polymerized vinyl resin in a state of suspension which would be readily discernible to the eye, thereby tending to diffract light, rendering the polymerized resin sheet opaque, or at best highly translucent.

Quite surprisingly, however, and contrary to all expectations, we have found that the incorporation of itaconic acid, or its homologues as hereinafter described, into vinyl resin polymers not only results in no interference with the passage of light through the polymer, but actually, and very noticeably, greatly improves transparency and reduction of haze, over a standard composition free of the itaconic class of acids, as will be shown in our following illustrative embodiments.

We might observe here that our use of itaconic acid and its homologues is restricted solely to the use of the acid in its monomeric acid form, and is not to be confused with various applications heretofore of the polymerized esters of itaconic acid which have absolutely no application for our particular purpose.

As an illustration of the lack of utility of the polymerized esters of itaconic acid and its homologues, a plasticized polyvinyl chloride composition containing 40 parts per 100 parts of resin of di(2-ethyl) hexyl phthalate, 5 parts per 100 parts resin of epoxidized soya bean oil, and 2 parts of a commercial liquid Ba—Cd—Zn phosphite stabilizer (containing 6.2% Ba, 2.1% Cd, 1.2% Zn, and 1.5% P) was tested by milling on a two-roll mill for 5 minutes at 320° F. then pressed for 10 minutes at 350° F. The same formulation as the foregoing with 0.05 part per 100 parts of resin of an n-propyl monoester of itaconic acid showed no observable improvement in clarity over standard. Examples utilizing the addition of 0.1 part per 100 parts of resin of the di-n-butyl ester of itaconic acid, or the addition of di-methyl itaconate were also ineffective. However, the addition of 0.05 part per 100 parts resin or 0.1 part per 100 parts resin, of itaconic acid very noticeably improved clarity to an extent that could be considered commercially significant.

By way of illustration, but not to be considered in any way a limitation upon the innumerable forms and variations this invention might take, without departing from its intended scope, the following are examples of various embodiments of our invention.

Throughout the following examples, both rigid and plasticized systems were fused on the mill at 320° for 5 minutes, the rigid (unplasticized) systems were fused at 350° for 10 minutes. In each case the milled samples were subsequently pressed at 350° F. using conventional procedures. By pressing two or more samples side by side in the press at the same time, a single fused sheet is obtained in which the individual samples can be directly compared. The multi-sample sheet thus prepared is held up to the light and difference in transparency is readily apparent, particularly at the line of demarcation between the samples. All samples were milled to 40 mils thickness.

The standard batch for plasticized systems was:
100 parts by weight resin [1]
5 parts by weight epoxidized soy bean oil
40 parts by weight dioctyl phthalate
2 parts by weight of a liquid Ba-Cd-Zn-P stabilizer as given in the footnote of Table II

[1] Polyvinyl chloride homopolymer; a copolymer of vinyl chloride and vinyl acetate containing 85% vinyl chloride; and a copolymer of vinyl chloride and vinylidene chloride containing over 75% vinyl chloride.

The standard system composition for rigid systems was:

100 parts by weight polyvinyl chloride homopolymer
2 parts conventional barium-cadmium soap polyol stabilizer of the type described in U.S. Patent 2,711,401

The foregoing standard compositions have been used because they constitute common reference formulations in the commercial testing of vinyl halides; the concept and examples of this invention are equally applicable to the familiar industrial variations in vinyl halide systems, i.e., the resin may be a vinyl-chloride-vinylacetate copolymer, a poly (vinyl chloride-vinylidene chloride) copolymer, polyvinyl chloride homopolymer, or a mixture of one or more of these resins with other resins; in the plasticized systems, the plasticizer may be any of several phthalate esters, esters of straight-chain dicarboxylic acids, epoxidized natural or synthetic esters, or any or all of these mixed with other commercially useful plasticizing agents.

This invention which is applicable to both plasticized and rigid compositions, is also applicable to intermediate classes of plasticization. Thus, in some so-called rigid compositions small amounts of plasticizer (e.g., 0.5-5.0 parts of epoxidized soy bean oil per hundred parts of resin), may be added to achieve some measure of heat stability and reduction in brittleness. This invention also applies to semi-rigids, where 5-30 parts of plasticizer are used. The plasticized formulations of this invention contain commonly 30-60 parts of plasticizer per 100 parts of resin, but in some applicable plastisol formulation even higher concentrations of plasticizer (e.g., up to 100 parts of plasticizer) may be used.

While the efficacy of the itaconic acid and its optimum economic concentration, will naturally vary with the other components of the system, the acids of this invention herein described are understood to be generally applicable to systems utilizing halogen containing vinyl polymers.

Utilizing the above listed standard plastic compositions, common to all the tests, the following rigid test samples were set up and run.

TABLE NO. I.—RIGID SYSTEM
[Parts per 100 parts resin]

| | Sample No. | | | | | |
|---|---|---|---|---|---|---|
| | 1 | 2 | 3 | 4 | 5 | 6 |
| Resin | PVC | PVC | PVC | PVC | PVC | PVC |
| Stabilizer [1] | 1.6 | 1.2 | 1.2 | 1.2 | 1.2 | 1.2 |
| Pentaerythritol | 0.4 | 0.3 | 0.3 | 0.3 | 0.3 | 0.3 |
| Alkyl Aryl Phosphite (9% P) | | | 0.5 | | | |
| Itaconic Acid | | | | 0.05 | 0.2 | 0.1 | 0 |
| Clarity Rating | 5-6 | 4 | 3 | 1 | 3 | 5-6 |

[1] Ba-Cd soap containing 10.5 Ba, and 15.5 Cd.

NOTE: Clarity rating 1 represents best clarity. Lower values represent a series of increasing haziness.

The results from the foregoing showed that system number 1, used as a standard, was inferior from the standpoint of clarity to system number 2, system number 2 having been chosen because phosphites do normally improve clarity. However, example number 3 was far superior to systems 1, 2 or 6 from the standpoint of clarity and freedom from haze illustrating superiority of itaconic acid over phosphite. Systems 4 and 5 confirm that, all other things being equal, the addition of itaconic acid induced an improvement in clarity and freedom from haze proportionate to the quantity of itaconic acid up to a maximum of 0.2 part itaconic acid per 100 parts of resin.

In accordance with the foregoing standard composition and procedure, the following plasticized systems were set up and run as tabulated in Table II below.

TABLE NO. II.—PLASTICIZED SYSTEMS
[Parts by weight per 100 parts polymer]

| | Sample No. | | | | | | | | | | |
|---|---|---|---|---|---|---|---|---|---|---|---|
| | 1 | 2 | 3 | 4 | 5 | 6 | 7 | 8 P (VC, VA) | 9 P (VC, VA) | 10 P (VC, VI) | 11 P (VC, VI) |
| Resin | PVC | PVC | PVC | PVC | PVC | PVC | PVC | P (VC, VA) | P (VC, VA) | P (VC, VI) | P (VC, VI) |
| Stabilizer [1] | | | 2 | 2 | 2 | 2 | 2 | 2 | 2 | 2 | 2 |
| Lead Stearate | 1 | 1 | | | | | | | | | |
| Di (2-ethylhexyl) phthalate | 40 | 40 | 40 | 40 | 40 | 40 | 40 | 40 | 40 | 40 | 40 |
| Epoxidized soya bean oil | 5 | 5 | 5 | 5 | 5 | 5 | 5 | | 5 | | 5 |
| Itaconic acid | | 0.5 | | 0.01 | 0.025 | 0.05 | 0.1 | | 0.05 | | 0.05 |

[1] Commercial liquid stabilizers, Ba-Cd-Zn-P containing 6.2% Ba, 2.1% Cd, 1.2% Zn, 1.5% P.
PVC = Polyvinyl chloride resin; P (VC, VA) = Poly (vinyl chloride, vinyl acetate) copolymer; P (VC, VI) = Poly (vinyl chloride, vinylidene chloride) copolymer.

A comparison of samples 1 and 2, pressed together in a conjoining sheet revealed that sample 1 was quite hazy, sample 2 clear. In a like manner, conjoining sheets of samples 8-9, and 10-11, showed a marked difference between the sample compounded with, and without, the itaconic acid; in each instance the sample containing itaconic acid was clear; the other, objectionably hazy.

Samples 3-7 exhibited progressively more clarity proportionate to the increase in itaconic acid, sample 3 appearing quite hazy. In both rigid and plasticized systems, additions much in excess of 0.5 part itaconic acid per 100 parts resin prove detrimental to clarity, for example, the addition of 1.0 part of itaconic acid caused greatly increased haze rather than improved clarity. It will of course be understood that the stabilizer type and quantity will have some minor effect on the optimum quantity of itaconic acid and its homologues necessary to achieve maximum clarity. For example, itaconic acid at 0.025 part by weight in the general system set forth in Table II above gave excellent clarity, in conjunction with 2 parts of a stabilizer containing 5.2% Ba, 2.8% Cd, 0.2% Zn and 1.3% P.

The tests exemplified by Tables I and II with the attendant explanatory data establish itaconic acid as one of the preferred acids of this invention.

To illustrate the utility of additional acids which are succinic derivatives and homologues of itaconic, trials were run according to the samples of plasticized systems listed in Table III below.

TABLE III

| | Sample No. | | | | |
|---|---|---|---|---|---|
| | 1 | 2 | 3 | 4 | 5 |
| Resin | PVC | PVC | PVC | PVC | PVC |
| Stabilizer [1] | 2.0 | 2.0 | 2.0 | 2.0 | 2.0 |
| Di(2-ethyl hexyl) phthalate | 40 | 40 | 40 | 40 | 40 |
| Epoxidized soy bean oil | 5.0 | 5.0 | 5.0 | 5.0 | 5.0 |
| Itaconic acid | 0.05 | | | | |
| Teraconic acid | | 0.05 | | | |
| Alpha-(cyclo-hexylidene) succinic acid | | | 0.05 | | |
| Alpha (isobutylidene) succinic acid | | | | 0.05 | |
| Alpha butylene succinic acid | | | | | 0.05 |

[1] Commercial liquid stabilizer, Bn-Cd-Zn-P containing 6.2% Ba, 2.1% Cd, 1.2% Zn, 1.5% P.

The five examples of Table III were processed compared to the same standard as utilized in Table II, following the same procedures for testing as for the examples of Table II; all samples 1 through 5 of Table III showing superior clarity to the control standard, which was sample 3 of Table II.

Best clarity was achieved by itaconic, teraconic and alpha(cyclo-hexylidene) succinic acid; the alpha isobutylidene succinic acid, and the alpha butylene succinic acid did not provide quite the degree of clarity as the others, but were still superior to the control standard.

From the foregoing it can be readily observed that the class of acids which we have found useful for the purpose of this invention is represented by the formula:

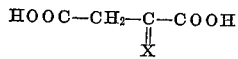

wherein X is a member of the group consisting of alkylene, alkylidene, and cyclo-alkylidene radicals containing 1 to 15 carbon atoms. This class of acids represents those readily formed from esters of succinic acid by the well-known Stobbe condensation process.

Species variation of the foregoing structural formula are represented by:

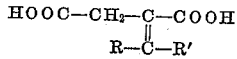

and

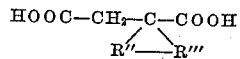

wherein, in the first species formula, R is a member of the group consisting of hydrogen, methyl, ethyl, isopropyl, 2-ethyl hexyl, methyl cyclohexyl, phenyl, cyclohexyl, isobutyl, and cyclopentyl; R' is a member of the group consisting of hydrogen, methyl, ethyl, isopropyl, 2-ethyl hexyl and methyl cyclohexyl, phenyl, cyclohexyl, isobutyl and cyclopentyl. In the second species variation listed above, R'' may be a member of the group consisting of methylene, isopropylidene, cyclohexylidene, n-butylidene, and $(CH_2)_n$; and R''' may be a member of the group consisting of methylene, isopropylidene, cyclohexylidene, n-butylidene, and $(CH_2)_n$ wherein $n$ may be an integer from 1 to 4.

In the first species variation listed above, whenever R and R' groups are not identical, two isomeric forms (cis and trans) are theoretically possible. This invention contemplates either, or a mixture of both, in each case.

Listed below are structural formulas of acids corresponding respectively, from top to bottom, to the acids set forth in Table III, namely, itaconic acid, teraconic acid, alpha-(cyclo-hexylidene) succinic acid, alpha (isobutylidene) succinic acid, and alpha butylene succinic acid:

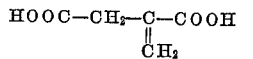

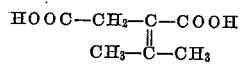

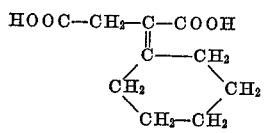

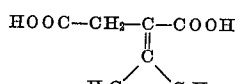

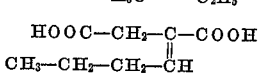

Itaconic acid and is homologues are generally solids which can be readily mixed with other powdered soaps, polyols, solid antioxidants, etc. to give a relatively homogeneous free-flowing mixture.

Itaconic acid in liquid mixtures generally requires the presence of some polar solvent, e.g., alcohols, or water, to effect solution, although at very low concentrations, non-polar solvents may be used without polar additives. The more highly substituted alkylidene and cycloalkylidene succinic acids are more soluble in non-polar solvents.

In the foregoing examples set forth in Tables I, II and III, the succinic acid derivative was found to be readily incorporated into the stabilizer as a premix for convenient batching of the resin system, thereby providing a number of advantages, such as requiring only one weighing instead of two, facilitated packaging and shipping, etc.

Our discovery includes the combination of itaconic acid and its homologues with any and all classes of stabilizers presently adaptable to be used in the foregoing and related systems, and would include the following:

(a) Metal salts of carboxylic acids, especially barium, calcium, cadmium, lead and zinc salts, e.g., barium oleate, cadmium 2-ethylhexoate, lead stearate, zinc pelargonate, calcium laurate, cadmium behenate, strontium caprylate, cadmium ricinoleate, barium tert butyl benzoate, zinc benzoate, zinc salicylate.

(b) Metal salts of phenols and substituted phenols, e.g., barium octylphenolate, zinc phenolate, barium tertiary butylphenolate, barium p-chloro-phenolate.

(c) Organo tin compounds containing at least one Sn—C bond and at least one Sn—O or Sn—S bond, e.g., dibutyl tin dilaurate, trioctyl tin marcaptide of thioglycollic acid, dibutyl tin laurate-maleate, dibutyl tin thioglycollate.

(d) Phosphites, e.g., triphenyl phosphite, diphenyl monoisooctyl phosphite, tris(nonylphenyl) phosphite, monophenyl diisodecyl phosphite, tris(2-ethyl hexyl phosphite), distearyl pentaerythrityl diphosphite.

(e) Polyols—e.g., pentaerythritol, dipentaerythritol, sorbitol, mannitol, trimethyloi ethane, trimethylolpropane, glycerol monooleate.

(f) Phenolic antioxidants—e.g., 2,4 - ditertiary butyl phenol, 2,6-ditertiary butyl phenol, 2,6-ditertiary butyl para cresol, 4,4-thiobis-(6-tert.butyl-meta cresol), isopropylidene bisphenol.

(g) U.V. absorbers, e.g., hydroxybenzophenone and its hydroxy, alkoxy, and alkyl derivatives; substituted triazines.

The proportions vary from stabilizer to stabilizer, and from system to system, depending upon the usual variables, such as end use, etc.

Total stabilizer usage is at 1–5 parts per hundred of resin, and the succinic acid derivatives would be incorporated therewith on such a basis as to provide the desired ranges, with respect to the resin, as indicated above.

Although we have, for purposes of illustration, shown only individual applications of the succinic acid derivatives useful in our invention, any combination of them, within the useful range as described, may be used to achieve the beneficial results of clarity as they are substantially compatible with each other in the foregoing and related systems.

We claim:
1. A composition comprising about 100 parts by weight of a polymer selected from the group consisting of polyvinyl chloride resins, and co-polymers of vinyl chloride with vinyl acetate and vinylidene chloride wherein at least 75% of the monomeric units were vinyl chloride, about 0 to 100 parts by weight of plasticizer per 100 parts by weight of said polymer, and about 0.005 to about 0.50 part by weight per 100 parts of said polymer, of an acid represented by the following structure:

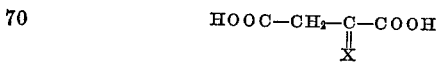

wherein X is a member of the group consisting of alkylene, alkylidene and cycloalkylidene radicals containing 1 to 15 carbon atoms.

2. The composition according to claim 1 wherein said

is a radical of the formula:

wherein R is a member of the group consisting of hydrogen, methyl, ethyl, isopropyl, 2-ethyl hexyl, and methyl cyclohexyl; and R' is a member of the group consisting of hydrogen, methyl, ethyl, isopropyl, 2-ethyl hexyl, and methyl cyclohexyl.

3. The composition according to claim 1 wherein said

is a radical of the formula

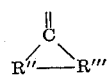

wherein R'' is a member of the group consisting of methylene, isopropylidene, n-butylidene, and $(CH_2)_n$; and R''' is a member of the group consisting of methylene, isopropylidene, cyclohexylidene, n-butylidene, and $(CH_2)_n$; wherein $n$ is an integer from 1 to 4.

4. The composition according to claim 1 wherein said acid is a member selected from the group consisting of itaconic acid, teraconic acid, alpha (-cyclohexylidene) succinic acid, alpha (isobutylidene) succinic acid and alpha butylene succinic acid.

5. A stabilizer combination for halogen containing vinyl resins, adapted to be incorporated into a polymer whose monomeric units are predominantly vinyl chloride, said stabilizer having contained therein an acid represented by the following structure:

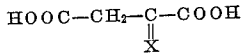

wherein X is a member of the group consisting of alkylene, alkylidene and cycloalkylidene radicals containing 1 to 15 carbon atoms, said acid present in such quantity as to provide 0.005 to about 0.50 part by weight of said acid, per 100 parts of said polymer, when said stabilizer is incorporated into said resin.

6. A stabilizer combination according to claim 5 wherein said

is a radical having the formula

R—C—R' wherein R is a member of the group consisting of hydrogen, methyl, ethyl, isopropyl, 2-ethyl hexyl, and methyl cyclohexyl; and R' is a member of the group consisting of hydrogen, methyl, ethyl, isopropyl, 2-ethyl hexyl, and methyl cyclohexyl.

7. A stabilizer combination according to claim 5 wherein said acid is a member of the group consisting of itaconic acid, teraconic acid, alpha (-cyclohexylidene) succinic acid, alpha (isobutylidene) succinic acid and alpha butylene succinic acid.

8. In the method of manufacturing a stabilizer for incorporation into a stabilized halogen containing vinyl polymer resin system whose monomeric units are predominantly vinyl chloride, the step of admixing with said stabilizer, prior to its incorporation into said resin composition, from about 0.005 to about 0.50 part by weight per 100 parts by weight of said resin, of a member selected from the group consisting of itaconic acid, teraconic acid, alpha (-cyclohexylidene) succinic acid, alpha (isobutylidene) succinic acid and alpha butylene succinic acid.

References Cited

UNITED STATES PATENTS 2,556,045   6/1951   Serdynsky et al. ____ 260—31.8

DONALD E. CZAJA, *Primary Examiner.*

R. A. WHITE, *Assistant Examiner.*